(12) United States Patent
O'Brien et al.

(10) Patent No.: US 11,410,102 B2
(45) Date of Patent: Aug. 9, 2022

(54) SYSTEM AND METHOD FOR A DYNAMIC RESOURCE ALLOCATION ENGINE

(71) Applicant: Walmart Apollo, LLC, Bentonville, AR (US)

(72) Inventors: John J. O'Brien, Farmington, AR (US); Brian McHale, Oldham (GB); Donald R. High, Noel, MO (US); Muhenned Abdulsahib, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 137 days.

(21) Appl. No.: 16/451,340

(22) Filed: Jun. 25, 2019

(65) Prior Publication Data
US 2019/0392365 A1 Dec. 26, 2019

Related U.S. Application Data

(60) Provisional application No. 62/689,638, filed on Jun. 25, 2018.

(51) Int. Cl.
*G06Q 10/06* (2012.01)
*G06N 20/00* (2019.01)

(52) U.S. Cl.
CPC ....... *G06Q 10/06313* (2013.01); *G06N 20/00* (2019.01)

(58) Field of Classification Search
CPC .......................... G06Q 10/06313; G06N 20/00
USPC ....................................................... 705/7.22
See application file for complete search history.

(56) References Cited

U.S. PATENT DOCUMENTS

| 9,646,081 B1* | 5/2017 | Volchegursky .... G06Q 10/0633 |
| 2007/0185754 A1* | 8/2007 | Schmidt ........... G06Q 10/06311 |
| | | 705/7.13 |
| 2011/0087625 A1* | 4/2011 | Tanner, Jr. ............. G06N 20/00 |
| | | 706/12 |

(Continued)

OTHER PUBLICATIONS

Eva Garcia-Martin, Crefeda Faviola Rodrigues, Graham Riley, Håkan Grahn, "Estimation of energy consumption in machine learning," Journal of Parallel and Distributed Computing, vol. 134, 2019, pp. 75-88 https://www.sciencedirect.com/science/article/pii/S0743731518308773 (Year: 2019).*

(Continued)

*Primary Examiner* — Folashade Anderson
(74) *Attorney, Agent, or Firm* — Duane Morris LLP; Manita Rawat

(57) ABSTRACT

A dynamic resource allocation engine which can assist in automating activities and processes within an organization. More specifically, the concepts disclosed herein can reduce operational costs by eliminating unnecessary devices, processes, and/or personnel, while also providing an efficient mechanism for testing the effects of new resources on the entire system. This is done by first combining data associated with devices, processes, and personnel, in a common (normalized) data format. This combination represents a simulation of the business or enterprise associated with the data, and can be referred to as a "resource allocation engine." The resource allocation engine provides information about how resources are being used within the organization.

15 Claims, 5 Drawing Sheets

(56) References Cited

U.S. PATENT DOCUMENTS

2014/0258357 A1* 9/2014 Singh ................... G06F 9/5094
                                                    709/201
2017/0132555 A1* 5/2017 Ritter ............... G06Q 10/06398
2019/0213509 A1* 7/2019 Burleson .......... G06Q 10/06393
2019/0237083 A1* 8/2019 Allen ....................... G09B 5/00
2019/0370724 A1* 12/2019 Liubyvyi ......... G06Q 10/06311

OTHER PUBLICATIONS

[Kant], Prasad, Gupta, Rosenberg, Sussman, and Weems. Topics in Parallel and Distributed Computing: Enhancing the Undergraduate Curriculum: Performance, Concurrency, and Programming on Modern Platforms, Springer International Publishing, 2018, ISBN : 978-3-319-93108-1, pp. 337 (Year: 2018).*

International Search Report and Written Opinion dated Sep. 20, 2019, issued in corresponding PCT Application No. PCT/US2019/038958.

* cited by examiner

SYSTEM AND METHOD FOR A DYNAMIC RESOURCE ALLOCATION ENGINE

CROSS REFERENCE TO RELATED APPLICATIONS

This present patent application claims priority benefit from U.S. Provisional Patent Application No. 62/689,638 filed on Jun. 25, 2018, the entire content of which is hereby incorporated herein by reference.

BACKGROUND

1. Technical Field

The present disclosure relates to resource allocation, and more specifically to an engine which combines device and personnel requirements such that the utility and efficiency of future devices, tasks, and personnel can be quantitatively evaluated.

2. Introduction

As new devices, processes, and personnel are introduced into a system, the benefits of those new business solutions are often touted as being highly superior over previous mechanisms and solutions. However, in reality, what often happens is that the new solution, while an improvement over a single item being replaced, fails to provide improvement to the overall system due to unplanned inefficiencies introduced by the new solution. For example, in allocating resources, and particularly human resources, to a system, a small change to one set of resources can have far reaching, unintended effects to the overall system. If multiple changes are being made, where each change might affect the other changes, how is the most efficient set of changes identified and selected?

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method performed according to principles disclosed herein can include: receiving a list of devices used within a distribution system, each device in the list of devices having at least one capability; receiving a list of tasks performed by human beings within the distribution system, each task in the list of tasks: identifying any devices in the list of devices required to perform the task; identifying human resources required to perform the task; and having a schedule identifying when the task is performed; generating, via a processor, a resource allocation engine for the system using the list of devices and the list of tasks performed by human beings, the resource allocation engine identifying commonalities between the list of devices and the list of tasks within the distribution system; receiving an additional item for inclusion within the distribution system, the additional item comprising one of an additional device and an additional task; and determining, via the processor and using the resource allocation engine, an efficiency level of implementing the additional item within the distribution system.

An exemplary system configured according to the principles disclosed herein can include: a processor; and a computer-readable storage medium having instructions stored which, when executed by the processor, cause the processor to perform operations which include: receiving a list of devices used within a distribution system, each device in the list of devices having at least one capability; receiving a list of tasks performed by human beings within the distribution system, each task in the list of tasks: identifying any devices in the list of devices required to perform the task; identifying human resources required to perform the task; and having a schedule identifying when the task is performed; generating a resource allocation engine for the system using the list of devices and the list of tasks performed by human beings, the resource allocation engine identifying commonalities between the list of devices and the list of tasks within the distribution system; receiving an additional item for inclusion within the distribution system, the additional item comprising one of an additional device and an additional task; and determining, using the resource allocation engine, an efficiency level of implementing the additional item within the distribution system.

An exemplary non-transitory computer-readable storage medium configured according to the concepts disclosed herein can have instructions stored which, when executed by a computing device, cause the computing device to perform operations which include: receiving a list of devices used within a distribution system, each device in the list of devices having at least one capability; receiving a list of tasks performed by human beings within the distribution system, each task in the list of tasks: identifying any devices in the list of devices required to perform the task; identifying human resources required to perform the task; and having a schedule identifying when the task is performed; generating a resource allocation engine for the system using the list of devices and the list of tasks performed by human beings, the resource allocation engine identifying commonalities between the list of devices and the list of tasks within the distribution system; receiving an additional item for inclusion within the distribution system, the additional item comprising one of an additional device and an additional task; and determining, using the resource allocation engine, an efficiency level of implementing the additional item within the distribution system.

DETAILED DESCRIPTION

Figure 1:
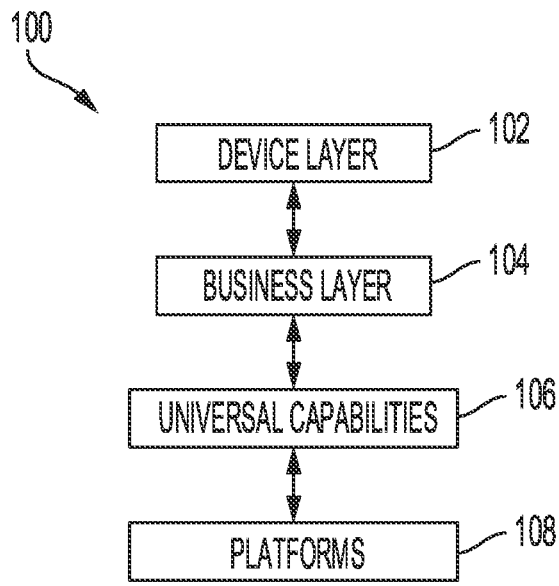
FIG. 1 illustrates an example system embodiment of a dynamic resource allocation engine.

Various embodiments of the disclosure are described in detail below. While specific implementations are described, it should be understood that this is done for illustration purposes only. Other components and configurations may be used without parting from the spirit and scope of the disclosure.

Disclosed herein are mechanisms for a dynamic resource allocation engine which can assist in automating activities and processes within an organization. More specifically, the concepts disclosed herein can reduce operational costs by eliminating unnecessary devices, processes, and/or personnel, while also providing an efficient mechanism for testing the effects of new resources on the entire system. This is done by first combining data associated with devices, processes, and personnel, in a common (normalized) data format. This combination represents a simulation of the business or enterprise associated with the data, and can be referred to as a "resource allocation engine." The resource allocation engine provides information about how resources are being used within the organization.

The data required to build an effective resource allocation engine can be quite specific. For example, the data required to effectively map out device usage and allocation can require that each device used within the organization provide power consumption levels for each task it can accomplish. Likewise, the data required to effectively map out an organization's processes can require information about what personnel are required, time periods associated with personnel performing tasks associated with the process (e.g., minimum, maximum, average, etc.), job titles of those personnel, devices required to perform the process, etc.

The information regarding devices, processes, and personnel is combined in a normalized, common format, such that the resource allocation engine can identify commonalities between the respective categories. For example, the process data can identify tasks which need to be accomplished for any given process, and the device data can identify which devices are needed to accomplish any given task. In this manner, the resource allocation engine can identify which devices are needed for a given process. Likewise, the process data can identify personnel requirements for a given process, and the personnel data can identify who is available (or who is required) to fulfill those processes. In other words, the device, process, and personnel data are combined together in a common, normalized format such that the entire operation of the system or organization can be effectively modeled.

The model produced by the resource allocation engine can then be used to evaluate new devices, processes, and personnel, particularly when the new resources will impact multiple levels or aspects of the organization. For example, a new device may be introduced which can reduce the time required for a given process, but may require additional personnel, which in turn renders the overall utility of the device to the organization to be negative. However, if the additional personnel can be used for other areas, their acquisition (as well as the new device) may be an effective way of improving the organization as a whole.

Making such determinations has previously been a trial-and-error process due to ineffective modeling. By providing predefined data using standards, the system can generate a dynamic resource allocation model which can (1) evaluate new resources for their overall effectiveness within the organization, and (2) self-modify overtime based on performances of the organization's resources (devices, processes, personnel, etc.).

FIG. 1 illustrates an example system embodiment of a dynamic resource allocation engine 100. In this example, there is a device layer 102 which interfaces with a business layer 104. The device layer 102 can contain data regarding the devices, and specifically the device capabilities, requirements, tasks which the devices can be used to complete, etc. The business layer 104 in this example can contain data regarding processes, personnel, trading, and/or other features needed to perform an organization's purpose.

The universal capabilities 106 interacts with the business layer 104, and identifies commonalities between the device layer 102 and the business layer 104. The universal capabilities list can continue to grow and expand over time, and provides a "checkbox" of where resources can be provided and used. The platforms 108 offer specific combinations which can take advantage of the universal capabilities 106 of the devices in the device layer 102 and the requirements of the business layer 104 based on the universal capabilities 106.

Figure 2:
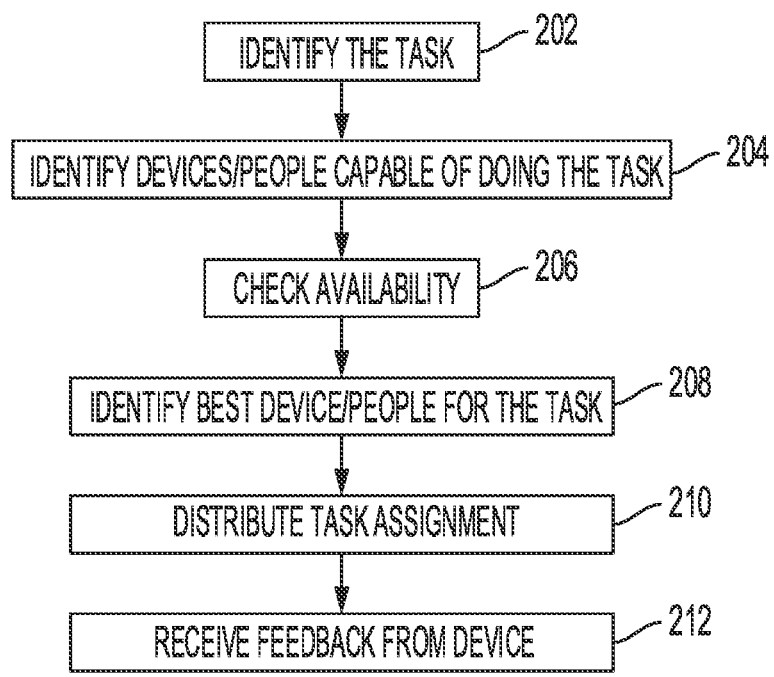
FIG. 2 illustrates an example process for task distribution.

FIG. 2 illustrates an example process for task distribution which can, for example, be evaluated by a dynamic resource allocation engine when a new task is received. In this example, the dynamic resource allocation engine receives a task and identifies the task (202). The dynamic resource allocation engine then identifies devices/people (or other resources) capable of performing the task (204), and checks on the availability (206) of the capable resources. Upon receiving notifications or a list of the capable, available resources, the dynamic resource allocation engine identifies the best device/people for completing the task (208) and distributes the task assignment (210) to the selected resource. The dynamic resource allocation engine can then receive feedback from the device (212) (or selected resource), which can be used to modify the dynamic resource allocation engine for use in future iterations of the task assignment process.

Figure 3:
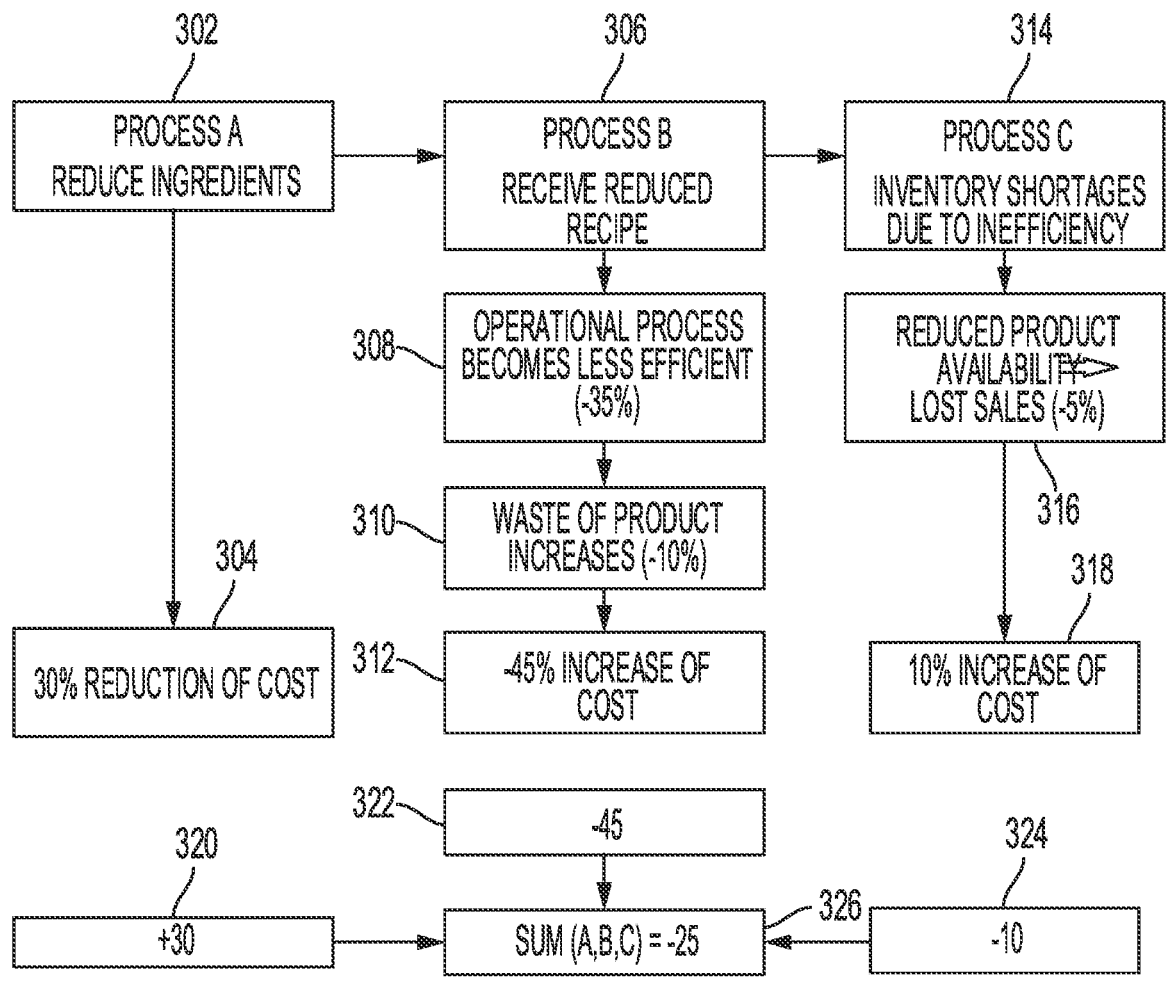
FIG. 3 illustrates an example multi-tier efficiency process.

FIG. 3 illustrates an example multi-tier efficiency process, where the dynamic resource allocation engine identifies the overall efficiency of a component based on the interactions of that component with other processes/resources within the organization. In this example, there are three processes, "A" 302, "B" 306, and "C" 314, all associated with the example of producing a cake. In this example, process A 302 is new, whereas process B 306 and C 314 were previously implemented.

Evaluation of process A 302 initially looks promising due to its 30 reduction of cost 304 by reducing ingredients needed to produce the case (a +30 efficiency score 320). However, by reducing the ingredients, process A 302 inadvertently impacts process B 306, which receives the reduced recipe. Specifically, the operational efficiency of process B is impacted, resulting in a 35% reduction in efficiency 308. In addition, the change in recipe results in product waste increasing 310, which combines to a total of a 45% increase in cost 312 (a −45 efficiency score 322).

Process C 314 is likewise impacted. Process C 314 is hit with inventory shortages due to inefficiency caused by processes A 302 and B 306, resulting in reduced product availability, which in turn leads to lost sales 316. This results in an increased cost to the organization of 10% (318), illustrated with a −10 efficiency score 324. The sum 326 of efficiency scores 320, 322, 324 is −25, meaning that adding process A 302 to the overall system will result in a net reduction of efficiency of 25%.

Figure 4:
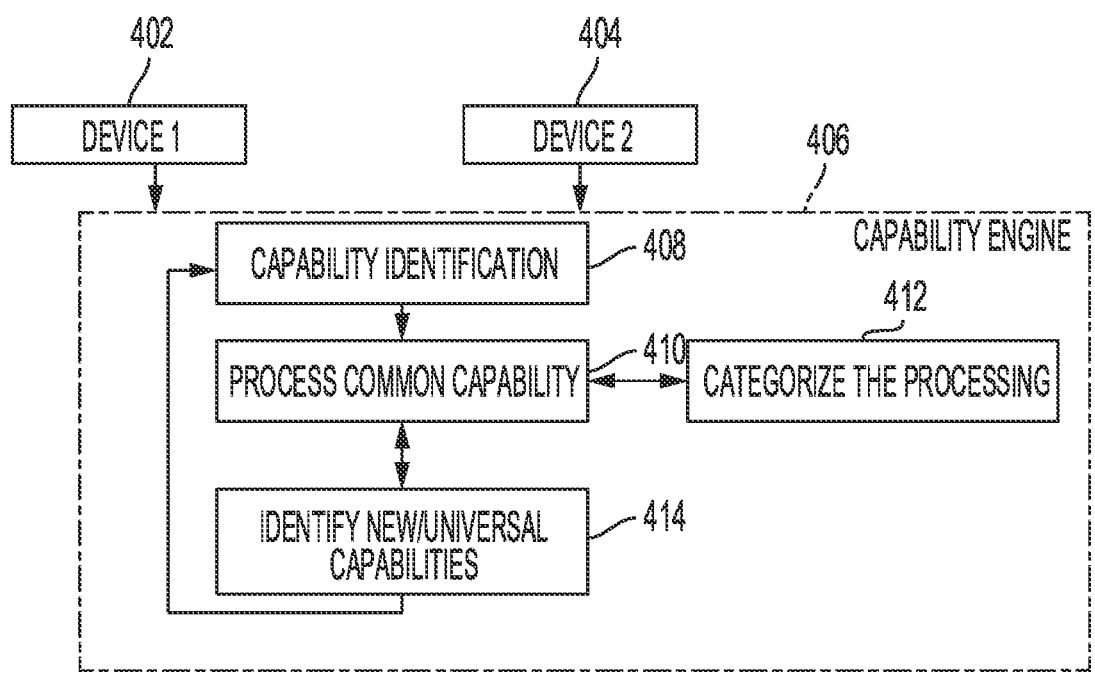
FIG. 4 illustrates an example of a capability engine.

FIG. 4 illustrates an example of a capability engine 406, which can be part of the dynamic resource allocation engine disclosed herein. As illustrated, the capability engine 406 is evaluating capabilities of two devices, device 1 402 and device 2 404, to determine if the devices share capabilities. The capability engine 406 first identifies the individual capabilities 408 of each device, then compares the two devices to determine any common capability 410. As part of this process, or alongside this process, the capability engine 406 can categorize any processing 412 performed by the respective devices. Using this information, the capabilities engine 406 can identify new/universal capabilities 414.

These are capabilities, processes, or actions which may be shared with other devices. An exemplary list of universal capabilities can be found at the end of this disclosure. Upon identifying universal capabilities 414, that information can be deployed by the system in future device capability identification 408 processes.

Figure 5:
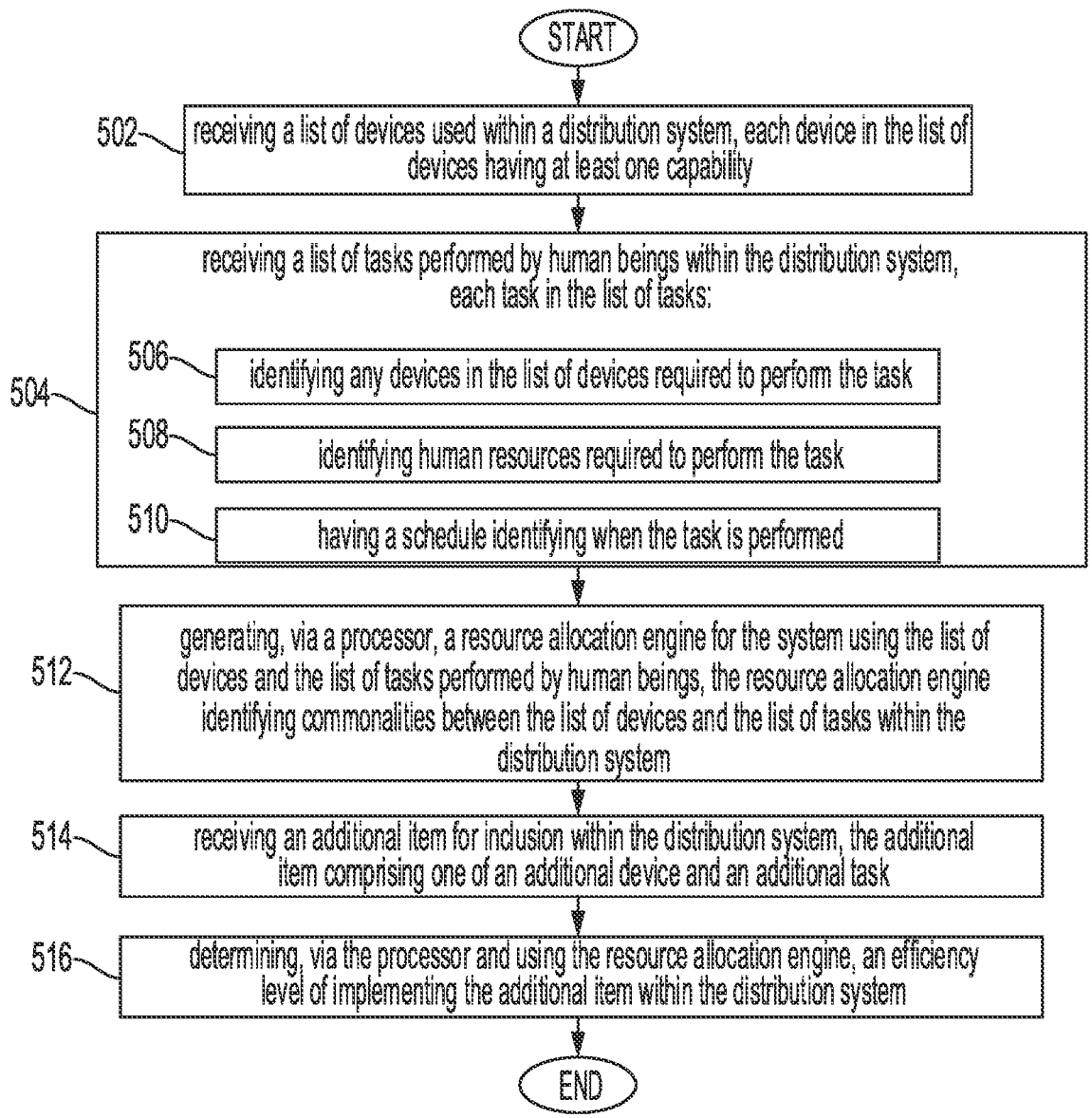
FIG. 5 illustrates an example method embodiment.

FIG. 5 illustrates an example method embodiment. In this example, the system performing the method receives a list of devices used within a distribution system, each device in the list of devices having at least one capability (502), and also receives a list of tasks performed by human beings within the distribution system (504). Each task in the list of tasks can include: identifying any devices in the list of devices required to perform the task (506), identifying human resources required to perform the task (508), and having a schedule identifying when the task is performed (510). The system can then generate, via a processor, a resource allocation engine for the system using the list of devices and the list of tasks performed by human beings, the resource allocation engine identifying commonalities between the list of devices and the list of tasks within the distribution system (512). The system can receive an additional item for inclusion within the distribution system, the additional item comprising one of an additional device and an additional task (514) and determine, via the processor and using the resource allocation engine, an efficiency level of implementing the additional item within the distribution system (516). The resource allocation engine can normalize the list of devices and the list of tasks performed by human beings into a common data format when identifying the commonalities between the list of devices and the list of tasks.

In some configurations, the determining of the efficiency level can include performing a causal analysis of how the additional item impacts the list of tasks and the list of devices.

In some configurations, the method can be further expanded to include the use of iterative machine learning to improve the resource allocation engine.

In some configurations, determining of the efficiency level of implementing the additional item can include: determining if the additional item has sufficient resources; determining if multiple devices using related data need to be evaluated collectively; and determining if the additional item should be available to at least one of other devices and the distribution system.

In some configurations, the list of tasks are from a plurality of disparate business organizations with the distribution system. Likewise, the commonalities can be identified based on a predefined list of capabilities, uses, and scheduling.

The steps outlined herein are exemplary and can be implemented in any combination thereof, including combinations that exclude, add, or modify certain steps.

Figure 6:
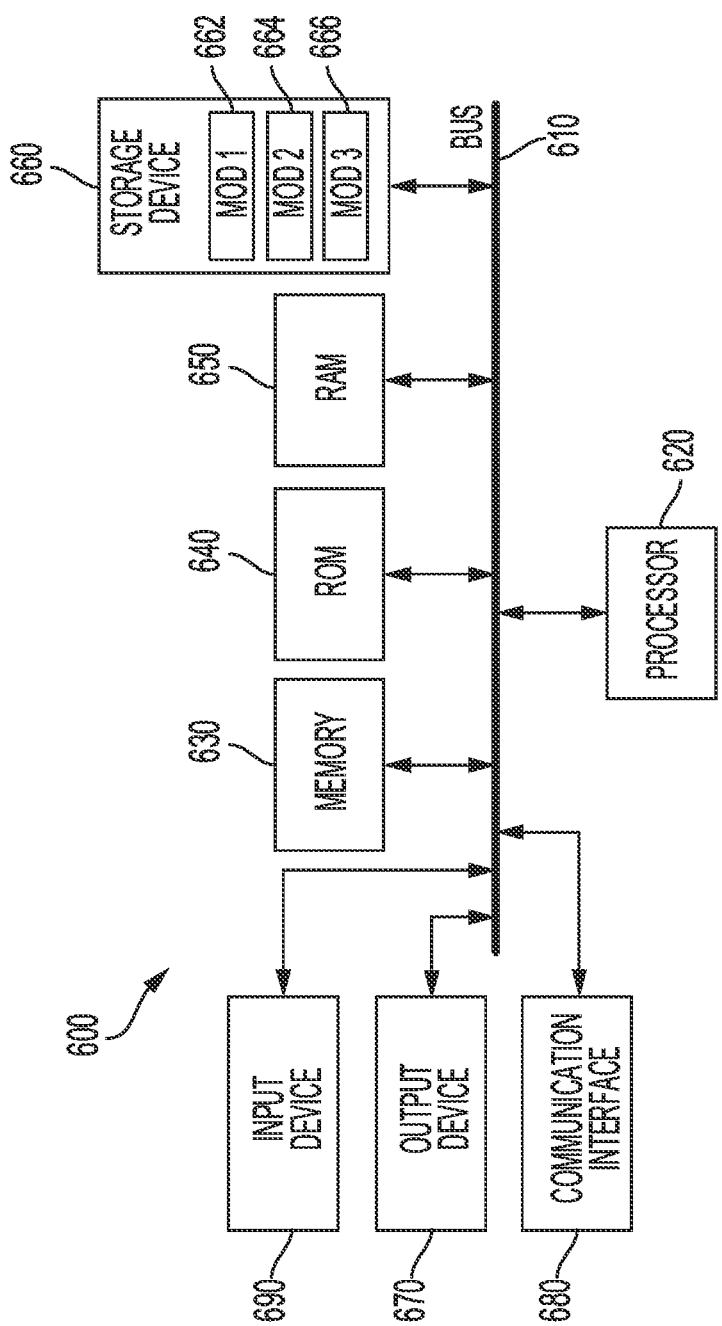
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Universal Capabilities

The common, or universal capabilities of the resources used and identified by the dynamic resource allocation engine can include the following. Please note that this list is not limiting, and may be expanded to include other areas and fields as needed. In addition, various capabilities which may or may not be included in various embodiments, depending on implementation details, may be indicated by questions marks.

Mapping
  a. Today versus Tomorrow:
    i. Every one of the robotics & devices must create its own point cloud (Today)
    ii. Could all robotics, devices, modular, features, etc. use the same point cloud (Future)
    iii. These could all feed into a single version
  b. Categories of obstructions: within mapping you need to identify static obstructions, permanent-static obstructions, temporary obstructions, logical obstructions, physical obstructions, all of which can be horizontal and vertical.
    i. Permanent-static obstructions: it's built-in with rare movement unless during a complete remodel. You don't need to validate if its still there.
      1. Ex: fixed walls, shelves, supporting building infrastructure, etc.
    ii. Temporary-static obstructions: non-wheeled/non-mobile object. You don't need to validate unless other data is provided.
      1. Ex: Features, cart corral, pallet.
    iii. Dynamic obstructions: self-mobile objects, people, and things.
      1. Ex: Carts, pallet jacks, rocket carts, customers,
        a. Different statuses
          i. Static or Mobile: if they are resting=static. If it's in motion=dynamic
    iv. Temporary obstructions: time-based and congestion-based obstructions that will no longer be an obstruction in period of time
      1. Ex: liquid spill, powder spill, broken glass, congestion,
    v. Digital obstructions: areas where coverage and support are limited
      1. Ex: No-Limited Wi-Fi signal strength
        a. Material Interference
        b. Magnetic Interference
        c. Signal Strength Interference
    vi. Lighting obstructions: areas where the lighting-strength creates an issue for the device or sensor
    vii. Logical Obstructions: is like Safeguard. Boundaries for property, etc. Openings and paths may be available through a boundary. It may have a logical boundary why conducting security surveillance, but it may break that boundary when its in pursuit.
      a. Example of this is not allowing the scanning or optical robots to enter the bathroom at certain times
      b. Geofencing
    viii. Vertical
      a. Ceiling and floor
      b. Fixtures
      c. Lights
      d. Doorways
        i. Type of door
          1. Single
          2. Double
        ii. Dimensions
        iii. Opening direction
        iv. locked versus unlocked
          1. Physical key
          2. Digital pad
          3. Badge-scan
        v. automatic versus manual
          1. What triggers automatic operation
        vi. indoor versus outdoor
  c. Passageways for mobile people and robots
    i. Doors
      1. Inside doors
      2. Outside doors
    ii. Terrain
    iii. Aisle
    iv. Off-limits within boundaries
    v. Out of bounds
  d. Access points
    i. Power access
      1. Type of plug
    ii. Fire: extinguisher, alarms, etc.
    iii. Lighting
    iv. HVAC
    v. Garbage compactor
    vi. Trucking bay door
  e. Object placement: where products go and where they fit
    i. Charging station placement
    ii. Docking station placement
    iii. Product placement
      1. Location of where to place product (Features, Mods, sidekicks, etc.) XYZ
      2. Dimensions of where the product fits
      3. Shelving, Features, Mods, Sidekicks, etc.
    iv. Materials placement
      1. Auto-C: water, cleaning materials, liquids, pads, scrubbers, etc.
    v. Tools placement:
      1. Conveyors, robotic arms, cart attachments, bin attachments, etc.
    vi. Parts placement:
      1. Wheels, replacement parts, sensors, etc.
  f. Methods of mapping: initially you may have started with a CAD; enhanced that CAD with a Google Street View; refined the Street View with a Robotic Scan; further refined the Scan by additional Scans; further refined by overhead cameras that identify congestion, etc. Over time you are going to build a library of heat maps for activity in the store that is like a weather map.

Thus, you will have what is the map in real-time with a layer of historical maps. Over time, through the historical maps and current real-time data you can anticipate through Ai a predictive mapping system.
  i. Initial
    1. Google Street View, CADs, Point Clouds, etc.
  ii. Ongoing
    1. Robots scanning during tasks
    2. Cameras scanning for traffic heat maps
    3. Associates scanning features, mods, etc.
  iii. Refinement—
    1. at different levels
      a. Change
      b. Deltas
  iv. Historical
    1. Collection of maps and data for mapping that can be received from any of the categories from mapping that is archived and analyzed by Ai to assist in predictive mapping techniques.
  v. Predictive
    1. Using Ai techniques that take in historical and current data
  vi. Frequency of updates to the MAP
  vii. Using customer's devices to update the map and count inventory (Google)
  viii. Sharing of maps and data
  ix. Events—time of day, special circumstances, holidays, etc.
g. Leverage cross over value for mapping techniques and data to other areas, such as Marketing and Real-Estate.
  i. For Real-estate, this could help identify areas to remodel with the least impact on store operations.
  ii. For marketing, this could identify areas of high traffic density to help drive the sales of products, etc.
h. Messaging & Alerting—Alerts would determine actions to be taken. Alerts may be made to change the navigation to a destination for rerouting. This may occur by the mothership instead of through the mapping system.
  i. NPL—natural processing language system
  ii. Communicate any changes to a map or alerts for a map through the messaging application
  iii. Device-device
  iv. Server-Humanoids via device
  v. Server-robots/devices
i. Update—authority of updates. What does the update mean? Does the update impact the decision making of devices using the map? Who has authority of updates? What updates can devices make to maps?
j. Delta of Maps
k. Others "Things" on map
l. Localization awareness
m. Initial map
n. Electronic Labels
  i. Universal swapping
    1. Should we use LCDs and Epaper together? Or, should we just use on solution so we can use it everywhere in the store?
    2. Cost of the label
    3. Can the labe survive the rigor and grit of the backroom? To make a more robust unit, how much does it increase the cost?
  o.
Power
a. Voltage
b. Alerting
c. Maintenance
d. Reporting
e. Messaging
f. Shared or convertible/adaptable docking station hookup
g. Battery swapping
h. Hybrid power solutions
i. Renewable Energy Solutions
j. Universal Battery Solutions
  i. Don's Black and Decker battery solution for his screwdriver that is capable of being used for hundreds of other tools.
    1. Is it cheaper to have two separate charging stations?
k. Questions:
  i. Power requirements for each of the devices?
  ii. Wireless recharge? Swappable from electromagnetic to direct line?
    1. Loss of power during induction
  iii. Safety to humans?
l. Widespread (cross coverage) of wireless power over an entire store versus in specific zones (such as, a docking station for devices and robots)
  i. Costs . . .
Docking Station
a. Needs:
  i. Sensor for vehicle recognition
  ii. Library for identify type of vehicle
  iii. Charging transformer that can be autonomously converted to whatever the requirements are for the charging
  iv. Sensor for identifying the battery level
  v. System for identifying how long of a charge is required and how long it will take.
  vi. System for sharing information on scheduling and current charge—how long, etc.?
b. One of the standards that we will use for the docking station is determining how autonomous it operates without the intervention of a human . . .
  i. It's adaptability for devices
  ii. It's ability to share current charging times, schedule and manage vehicles being charged, etc.
    1. Does this increase the cost?
c. Schedules the charging. We have a drone patent on this. Need to include.
d. Safety—does it protect the customer and associate
e. Safe-Haven for vehicles
f. Able to provide updates to the vehicle while docked
g. Able to do maintenance and servicing to the vehicle while docked
h. Could also be considered a Ground Control Station
i. Could recharge liquids, detergents and chemicals for devices like the Audo-C
j. Could be an area where the connectivity is strong and allows the vehicles to download large amounts of data securely
Autonomy—when do people have to step in?
a. Mapping and Localization
b. What are our levels of autonomy? What standard are we adopting (Cars? Robotics?)
c. Autonomous navigation
d. Autonomous mapping
e. Autonomous docking station
f. Autonomous checklist to make sure it's ready to run
g. Autonomous help-requesting—can it ask for help?
h. Autonomous process deconfliction—if something is keeping it from performing the task, can it work to still accomplish the task?

i. Autonomous task management, scheduling, reporting, etc.
j. Is the initial setup autonomous?
k. Once initial setup is completed, does it operate autonomously?
l. Is the maintenance autonomous?
m. Can it dynamically reroute if objects are blocking its original path?
n. Can it dynamically assign a route based on what it needs to do? Can you give it a product and it figure out its own route to get there?
o. You will have a chart with different categories of autonomy and we will define values for each category from the vehicles ability to be autonomous in that category.
p. There is a one-time initial setup that has to occur. It appears that on some of these bots that there is a daily setup that has to occur (Audo-C, Bossallova, etc.) Many of these have to be chaperoned. If they have to be monitored while they are working, they are not autonomous—this would be considered a 0-level.
   i. Levels of autonomy: "Making an independent system work on its own"
      1. Lvl 1—if it can carry out its work after the initial setup
      2. Lvl 2—if it can put itself up
      3. Lvl 3—if it can recharge and refill
      4. Lvl 4—if the store manager doesn't have to schedule it
      5. Lvl 5—if it can maintain itself
   ii. Others levels:
      1. Can it interact and at what level? Audible commands
      2. Does it have a mobile application that can be downloaded on any device to monitor it?
      3. Can it read hand motions?
      4. Pre-activity—initial setups
      5. Post-activity—docking, charging, refilling, uploading, etc.
      6. If it gets in trouble, can it request help? Can it solve the issue?
         7. Remote access—see what it sees. C2 remote-control of device Safety—who could be harmed versus "Protection (Security)"
a. Customer
b. Unit
c. Store property
d. Devices:
   i. Docking stations
   ii. Robots
e. De-humanizing
f. Sharp edges
g. Electrical Exposure
h. Crushing, bumping, smashing
i. Force, Speed, etc.
j. Stopping rating
k. Machine generated heat
l. Chemicals
m. Explosion factor
n. Radiation factor
o. Electrical grounding
p. Gas factor
q. Noise factor
r. Lights factor—too bright, etc.
s. Sharp edge factor
t. Temperature factor—hot or cold
u. Fire factor
v. Altitude factor
w. Humidity factor
x. Balance/Tipping factor
y. Height factor
z. Horizontal & Vertical mapping (point cloud)
aa. Power surging factor
bb. Static electricity factor
cc. Smell factor
dd. Fright/Startle factor
ee. Vacuum factor
ff. Waterproofing factor
gg. Environmental proofed for outside use
hh. EMP factor/Magnetic
ii. Does it create contaminants
jj. Mechanical and electrical exposure
kk. Run over human body parts (foot, hands, fingers, etc.)
   i. Wheels, rollers, etc.
ll. Sense and avoid—ability to maneuver around objects, people, and things.
mm. Sounds, lights, messaging, alerting—to provide awareness to those objects, people, and things.
   i. Turn signals. Backup signals. Drive signals. Audio messages. "Backing up, just letting ya know" "Turning Right, have a good day". Choose regionally appealing sounds and messages: "Ya'll back up now you here."
   ii. Images: Emojis, pictures, etc. The idea is these could be combined with messages and alerts to make the robots operation more-friendly.
nn. Clearance between robotic units when travelling (Audo-C and Bossa Nova travelling on the same lane—need to leave room for people if they are in the proximity)
oo.

Scalability & Sustainability
a. Communications: it can accommodate today and the futures communications.
   i. Example: Website plans
b. At what point do we have so many robots that we fail? How do mitigate that in advance? The concern=management of too many devices. Solution=Quantum Computing+
c. Can you manufacturer your solution for 4700 stores in 2-years?
d. Can you maintain it? Do you have the support system in place?
e. Can you monitor the solutions?
f. Can you be proactive with maintenance, updates, etc.?
g. Can you sustain?
h. Levels of scalability?
i. Can you monitor and maintain?
j. What are you doing to make it easier to manage? Manageability?
k. What's their upgradeable path? Future proofing!!! Hardware, software, etc. We should be able to get upgrades at limited-no cost as they are implemented.
l. What's the migration or transition path to do upgrades?
m. Innovativeness—are they ahead of the technology curve? Are they pushing the boundaries?
n. Open System—

Shareability
a. Could be a standard by which everyone has to share information within.
b. Shareability has application to task management, security, etc.
c. Consideration could be in how much it raises the price . . .

Messaging & Alerting
a. Types of messaging:
  i. Audio
  ii. Visual
    1. Picture
    2. Video
  iii. Text
  iv. Machine-based
  v. Device-based
  vi. Financial
    1. Crypto
  vii. Private, Public, Secret, Management level, associate level, customer, department, etc.
Processing Power
a. Quantum computing
b. What are the requirements for computing?
c. Status Updates
Events
a. Location-Based
  i. Global
  ii. National
  iii. Local
b. Fixed calendar events: MTWRFSS
c. Temporary-static events:
  i. Holidays
  ii. Fiscal YR dates
d. Temporary dynamic events:
  i. Fair
  ii. ball games
e. Planned events
  i. Long-term
  ii. Short-term
f. Unplanned events:
  i. weather creates a lot of unplanned events
  ii. incidents
  iii. unknown unknown
  iv. unknown known
g. Message auditing and logging
h. Demographic
i. Cultural
j. Social Media
k. Pre-event, Event, Post-event (in between each you have the start, end, duration, etc.)
Reporting
a. Messaging
b. Alerting
c. Mission
d. Maintenance of device
e. Success
f. Failure
g. Incident
h. Who to report
i. Where to report
j. When to report
k. Why to report . . .
l. How to report . . .
m. What to report . . .
Data—everything that needs to be captured in order to support everything else
a. What levels of data capture
  i. Granularity—could also be the gateway (entry point)
b. Store Data
c. Regional
d. Home-Office Aesthetic of the Device—we want our devices to be appealing, welcoming, clean, and safe.
  a. De-humanizing—make robots look like robots and not like people or animals.
Infrastructure Installations—how much do we have to change the store for the solution to work?
  a. QR codes, magnetic strips, docking stations, etc.
  b. For instance, Google is leveraging what we already have to build out our maps and allow customers and associates to update the map, etc.
Mission Management
  a. What's the best route?
  b. What's the best device?
  c. What's the best combination of devices?
  d. What's the best time?
  e. What's the impact on the store? Financial impact? OSCA impact? Business impact?
  f. Task and decision
  g. Data element
  h. Scheduling
  i. Tasks
  j. Alerting
  k. Messaging
  l. Localized decision making versus cloud decision making (mothership versus central server).
  m. Traffic Management
Security—a way in which you ensure things are secure. Protecting devices, people, store, assets, associates, etc.
  a. Real-time checking
  b. Inter-device checking
  c. Alerting
  d. Messaging
  e. Network integrity
  f. Channels
  g. Encryption
  h. Communication
  i. Data security
  j. Authorization for overrides
  k. Physical access to certain locations
Communication—the difference between messaging and communication is that communication is the mode and messaging is the content. COMS becomes your C2 for messages.
  a. 4 types of communications:
    i. Interpersonal communication
    ii. Non-verbal communication
    iii. Oral communication
    iv. Visual communications
  b. Size and Urgency are a major construct of what, when and how we do communications.
  c. Frequency—how often is the message repeated.
  d. Distribution—
  e. Log—tracking of all the content: messages, malfunctions, functionality, etc.
  f. Summary of metrics
  g. Alternatives for messaging when it isn't able to be communicated in the standard/typical way; the communications systems will manage what modes are used to distribute content (MSGs)
  h. How do you get a message into robot, then to the command center, and then to the home office?=Filtering, routing, and summary.
    i. Summary—you need to select and present only the valuable content
    ii. Filtering—you need to send the right content to the right entities
      1. For example, an operations manager versus a senior leader are going to want different levels of information and detail.

2. Do the rules change based upon the size of the message? Think—size of emails? Alternatives in email sizing issues, using a drop box. Are there elements of this we should consider?
3. Validation of the communication—is it coming from a reliable source? Is it scanned? What do we do with communication that is flagged as a potential virus?
   a. Currently, AMO protects the stores communication—viruses . . . data size . . . etc.
iii. Public update/announcements messages: these can be similar to a meeting notification.
iv. Routing—you need to send the right content to the right entities in the most efficient data path, travel path.
v. Intelligence—what gets communicated when, where, why, how, and what?
1. Receiver—what (MSG) is the receiver going to want to know in the way of content and how (COMS) are we going to get it to them?
2. Message Manager/UP Display—how is the MSG and COMS presented to the receiver? The UI should have selections and options available to the receiver so that they can determine what MSGs and COMs are presented. This needs to be configurable so that the receiver can determine what content they want to see (similar to a control panel for facebook, etc.)
   a. The UI should have options for the end-user (robot or person) to accept or decline messages; block off and allot time; etc.
3. UI should know how long actions take, etc.
4. Messages should have a respond by time option.
5. Scheduling—scheduling tasks and actions based on communication.
6. Sender—what information should I be sending to receivers and how do they want it displayed, presented?
i. Alerting
j. Messaging
k. Standard
l. Status
m. Security
n. Physical methods of communication (Digital Inputs); you would need AI to run against these inputs to identify these:
   i. Going out:
      1. Audio—language processing.
      2. Text—slang
      3. Lights/Visual—standard signals—known. May be different by region.
      4. Movement
      5. Alerts
      6. Voice
      7. Signals—standard signals—known. May be different by region.
   ii. Going in:
o. Alternatives of communication when the internet is overloaded:
   i. Cellular
   ii. Radio
p. Routing of communication
   i. Recipient: Who receives the message
   ii. Distributor: Who distributes the message
   iii. Management: Who tracks the message. The status of the messages delivery. The
q. Filtering of communication
   i. Recipient: Who receives the message
   ii. Distributor: Who distributes the message
   iii. Management: Who tracks the message. The status of the messages delivery. The
r. Chat bots; the only chat bots we have in place is IVR, which is not a true chat bot.
s. Voice to text
t. Categories of messaging
   i. Alerting
   ii. Frequency
   iii. Priority of messaging—does the priority of the message as it pertains to the location in the queue does it change over time. At what point does a low priority move up in priority? What makes the determination?
   iv. Criticality/Seriousness of Message
   v. Urgency of action—if you didn't respond, it goes to escalation.
   vi. Escalation
u. Modes
   i. Note on a screen from a mobile application
   ii. Email
   iii. Text
   iv. Phone call
   v. Broadcast
   vi. Audio
   vii. Chatbots
   viii. Images
   ix. Sirens
   x. Alarms
   xi. Polite: greeting. message, etc. (audio, text, etc.)
v. Incoming ways of inputting messages
   i. Computer messaging
      1. Associate messaging
      2. Customer messaging
   ii. Human messaging
   iii. Status messaging
      1. Order ready
      2. Order waiting
      3. Order in queue
   iv. Push & Pull Messages
   v. Notifications & Alert Messages
      1. May expect an action
      2. May be informative
   vi. Warning messages
      1. May expect an action
      2. May be informative
   vii. Advisories & Watch
   viii. Specific-entity messages
      1. Customer
      2. Associate
      3. Device, unit.
w. completion if available of an action for a message.
x. Messages that demand an action in a certain period of time
y. Message escalation
z. Followup messaging
aa. Message series/chain of messages
bb. Family of messages (department, zone, store, region, etc.)
cc. Message privacy
dd. Internal messaging
ee. External messaging
   i. Authority—police, etc.
ff. Levels of encryption
gg. Messaging Queue or Broker
hh. Message routing
   i. Machine communicates to a Ground Control Station
   ii. GCS communicates to a cell service iii. Cell service communicates to a Fire DPT
iv. Fire DPT receives and acts by putting out the fire
ii. Message tracking & reporting
i. Escalation list
jj. Message feedback and effectiveness tracking
i. Escalation list
kk. Message archiving
i. Pruning of store—auto-delete of old messages
ll. Message thresholds and conditions
mm. Message broadcasting
nn. Message filtering—Who Receives. Filtering only relevant messages so that the recipient doesn't get overloaded
i. Bombardment
ii
oo. Services
i. SMTP
ii. POP3
iii. Paging
iv. SMS (Short Message Service)
1. Guaranteed message delivery using a store-and-forward approach
2. Ease of use, without additional software or hardware
3. Low-cost method for information delivery
4. Revenue source for service providers
v. Enhanced Message Service (EMS)
1. Sounds and melodies
2. Pictures and animations
3. Formatted text
4. Concatenated Messages
vi. Multimedia Message Service (MIMS)
vii. Instant Messaging
viii. HDML Notifications
1. Alert
2. Cache Operation
3. HDML decks, images, and digests
ix. WAP Push
1. Push Initiator (PI)
2. Push Proxy Gateway (PPG)
3. WAP Client
4. Push submission
5. Push cancellation
6. Push replacement
7. Status Query
8. Client Capabilities query
x. Operations
1. Service indication (SI)
2. Service loading (SL)
3. Cache operation (CO)
xi. Application-application
pp. Natural Language Processing Engines
Cloud and decision making: 1) tools 2) data storage 3) AI & ML
a. Status
b. Security
c. Reporting
d. For instance with ESL, how will price changes be made to ESL tags? From home office on down? Or, will we have tunable controls for different levels (store, region, etc.)?
e. Volumes of data
f. AI
g. ML
h. How do you communicate information into the cloud? What are the standards? When should cloud updates be sent? How often?
i. Decision making
i. Nobody gets to make that choice, the AI does
ii. System that accepts requests (Inputs from humans and others)
iii. Engine that decides from the requests the decision to be made
1. Current state. Interrupting state. Accept/reject. Notify of the outcome or decision. Feedback loop. Post-analysis.
iv. The king is determined at what level is the decision coming from. The home office or store manager can be the king for the decision dependent upon the circumstance.
1. Anything that is an ultimate decision (such as you cannot fly)—becomes first.
2. Decisions trees with roles, ranks, responsibilities.
j. Scenarios
i. Robot allocation: Robot that only moves products, not pallets. Patent
1. You have returns that need to go back
2. You have customers in the pickup area
3. Components needed for the above:
a. Database, engine, product identifier, product location, mapping, localization, scheduling, reporting, power, tasks capability engine, events (shopping traffic), device management (maintenance, updates), rules, tiers, decision making engine, communication, safety, standards, requests, proximity to the task, etc.
b. Performance ratios of the device/robot/person compared with the task (Subaru versus a truck for moving 150 flagstone rocks); then, issue tasks by ratios which makes a system
c. Capabilities of the device/robot/person compared with the task
d. Criticality of the task: time, cost, customer service, etc. Each one can be tuned specifically for priority over the rest.
e. Devices are a part of the solution.
f. Go beyond the device. The system should determine what the device does.
g. If you go through each of the scenarios and identify the commonalities, you can start to determine what are the decisions and where and when do those decisions need to be made.
h. What's the backout plan for the decision?
i. We need to think through the components that makeup the decision?
k. Dynamic Price Changes
Open API—
a. API defines two things: 1) Mode of communication 2) Message 3) Security protocol may also be included (establish an account and accountability)
b.
Scheduling—it's not just on time of day but the customer, usage, etc. Maximum utilization.
a. Scheduling of activities is going to be determined by operational time tables to drive efficiency.
b. Customers traffic patterns
c. When is it most needed
d. What is the impact
e. POS data
f. Time of day
g. Is there a time of day that an IoT Device should be distributing data?
i. Should they be on a different band/channel
ii. Should there be a checklist that each thing must go through?
h. Alerting
i. Messaging Gateway (Entry decision for inclusion as a good neighbor into the ecosystem)
  a. A process to determine acceptable, unacceptable, and outstanding.
  b. Will it fit? Why not?
  c. ROI computed in advance
  d. Future proofing—to ensure the technology has an acceptable life cycle
  e. Are you creating a problem? Solving one? Impacting positive change?
Traffic Management
  a. Drives scheduling, routing, and activity planning.
  b. Traffic MGT of devices—physical navigation paths and routing.
  c. Alerting
  d. Messaging
  e. Standard
  f. Status
  g. Security
Rules—guide decision making
  a. Rules for: support, customer, operational, system, location, etc.
  b. Rules define the Standards; standards define the parameters of the law
    i. ISO Standards
  c. Task and decision are being optimized by rules. The rules don't need to be just off time any more but rather based on the current profile of the store and rule engine is being dynamically tuned for the profile by Ai that is shared in a simple format with associates.
  d. Status
  e. Reporting
  f. Security
  g. Volumes of data
  h. AI
  i. ML
Localization—different methods for identifying where something is.
Sensors—internal sensors, external sensors, etc.
  a. Interference
Routing
  a. Dynamic
  b. Static
Roles & Responsibilities
  a. Capabilities
  b. Task efficiency and effectiveness
AI & ML
  a. Algorithms
  b. Chat bots
Autonomy
  a. Mission
  b. Setup
  c. Checklist
  d. Recharging
  e. Storage
Processing Computing—Quantum versus standard
Outputs—what is it generating? Where does it go? Why does it go? How does it go?
  a. Devices
  b. People
  c. Robotics
Internal Systems
External Factors
  a. Marketing
  b. Real Estate
  c. ISD
  d. Power Management
Levels & Priorities
  a. Levels of intelligence—dictates authority of decision making/command. Example: if a robotic unit was travelling from inside to outside with sensitive products, it may rely upon a C2/mothership to determine if its "ok" to travel outside with the sensitive product. There are also no absolutes, there are sliding scales for this. So, the sensitive product may be able to handle 3-minutes of exposure, so it may be "ok" even though the weather isn't ideal.
    i. Artificial
  b. Individual resource intelligence
    i. ESL, Device, Robot, etc.
  c. Onboard intelligence
  d. Shared/Coordinated intelligence
    i. Flight controller, mainframe, etc.
  e. Remote intelligence
    i. Mothership, C2, etc.
  f. Pass control from entity—entity
Decision Making
  a. Levels of decision making
    i. Sensor/Component
    ii. Unit
    iii. Category of Units
  b. Overrides
  c. Autonomous
  d. Who needs to be bothered by the decision
  e. Frequency of the decision
    i. Time
    ii. Occurrence
  f. Impact
    i. Positive
    ii. Negative
    iii. Financial
    iv. Customer
    v. Operation
  g. You begin to optimize the business through the use of different data points
    i. We are going to get new and innovative ways of looking at the business that have never been discovered before
Checklists
  a. Operational/functionality checks
  b. Tasks checklists
  c. Procedural checklists
  d. When was I maintained?
  e. Storage
  f. Legal

We claim:

1. A method comprising:
receiving a list of devices used within a distribution system, each device in the list of devices having at least one capability;
receiving a list of tasks performed by personnel within the distribution system, each task in the list of tasks:
identifying any devices in the list of devices required to perform the task including a corresponding power consumption for performance;
identifying resources required to perform the task; and
having a schedule identifying when the task is performed;
generating, via a processor, a resource allocation engine for the distribution system using the list of devices and the list of tasks, the resource allocation engine identifying commonalities between the list of devices and the list of tasks within the distribution system, the resource allocation engine further normalizes the list of devices and the list of tasks into a common data format when identifying the commonalities between the list of devices and the list of tasks;

determining, via the processor and using the resource allocation engine, an original efficiency level of at least one device of the list of devices and at least one task of the list of tasks within the distribution system, the original efficiency level being based on the corresponding power consumption of the at least one device to perform the at least one task;

receiving an additional item for inclusion within the distribution system, the additional item including at least one of an additional device and an additional task;

determining, via the processor and using the resource allocation engine, an efficiency level of implementing the additional item within the distribution system, the efficiency level being based on the corresponding power consumption associated with the additional item;

in response to the efficiency level of implementing the additional item being greater than the original efficiency level without the additional item, selecting a set of devices associated with the efficiency level of implementing the additional item;

distributing corresponding tasks to the selected set of devices;

receiving feedback from the selected set of devices;

modifying the resource allocation engine based at least in part on the feedback from the selected set of devices; and using iterative machine learning to improve the resource allocation engine.

2. The method of claim 1, wherein the determining of the efficiency level comprises performing a causal analysis of how the additional item impacts the list of tasks and the list of devices.

3. The method of claim 1, wherein the determining of the efficiency level of implementing the additional item further comprises:
determining if the additional item has sufficient resources;
determining if multiple devices using related data need to be evaluated collectively; and
determining if the additional item should be available to at least one of other devices and the distribution system.

4. The method of claim 1, wherein the list of tasks are from a plurality of disparate business organizations with the distribution system.

5. The method of claim 1, wherein the commonalities are identified based on a predefined list of capabilities, uses, and scheduling.

6. A system comprising:
a processor; and
a computer-readable storage medium having instructions stored which, when executed by the processor, cause the processor to perform operations comprising:
receiving a list of devices used within a distribution system, each device in the list of devices having at least one capability;
receiving a list of tasks performed by personnel within the distribution system, each task in the list of tasks:
identifying any devices in the list of devices required to perform the task including a corresponding power consumption for performance;
identifying resources required to perform the task; and
having a schedule identifying when the task is performed;
generating a resource allocation engine for the distribution system using the list of devices and the list of, the resource allocation engine identifying commonalities between the list of devices and the list of tasks within the distribution system, the resource allocation engine further normalizes the list of devices and the list of tasks into a common data format when identifying the commonalities between the list of devices and the list of tasks;
determining, via the processor and using the resource allocation engine, an original efficiency level of at least one device of the list of devices and at least one task of the list of tasks within the distribution system, the original efficiency level being based on the corresponding power consumption of the at least one device to perform the at least one task;
receiving an additional item for inclusion within the distribution system, the additional item including at least one of an additional device and an additional task;
determining, using the resource allocation engine, an efficiency level of implementing the additional item within the distribution system, the efficiency level being based on the corresponding power consumption associated with the additional item;
in response to the efficiency level of implementing the additional item being greater than the original efficiency level without the additional item, selecting a set of devices associated with the efficiency level of implementing the additional item;
distributing corresponding tasks to the selected set of devices;
receiving feedback from the selected set of devices;
modifying the resource allocation engine based at least in part on the feedback from the selected set of devices; and
using iterative machine learning to improve the resource allocation engine.

7. The system of claim 6, wherein the determining of the efficiency level comprises performing a causal analysis of how the additional item impacts the list of tasks and the list of devices.

8. The system of claim 6, wherein the determining of the efficiency level of implementing the additional item further comprises:
determining if the additional item has sufficient resources;
determining if multiple devices using related data need to be evaluated collectively; and
determining if the additional item should be available to at least one of other devices and the distribution system.

9. The system of claim 6, wherein the list of tasks are from a plurality of disparate business organizations with the distribution system.

10. The system of claim 6, wherein the commonalities are identified based on a predefined list of capabilities, uses, and scheduling.

11. A non-transitory computer-readable storage medium having instructions stored which, when executed by a computing device, cause the computing device to perform operations comprising:
receiving a list of devices used within a distribution system, each device in the list of devices having at least one capability;
receiving a list of tasks performed by personnel within the distribution system, each task in the list of tasks:

identifying any devices in the list of devices required to perform the task including a corresponding power consumption for performance;

identifying resources required to perform the task; and having a schedule identifying when the task is performed;

generating a resource allocation engine for the distribution system using the list of devices and the list of tasks, the resource allocation engine identifying commonalities between the list of devices and the list of tasks within the distribution system, the resource allocation engine further normalizes the list of devices and the list of tasks into a common data format when identifying the commonalities between the list of devices and the list of tasks;

determining, via the processor and using the resource allocation engine, an original efficiency level of at least one device of the list of devices and at least one task of the list of tasks within the distribution system, the original efficiency level being based on the corresponding power consumption of the at least one device to perform the at least one task;

receiving an additional item for inclusion within the distribution system, the additional item including at least one of an additional device and an additional task;

determining, using the resource allocation engine, an efficiency level of implementing the additional item within the distribution system, the efficiency level being based on the corresponding power consumption associated with the additional item;

in response to the efficiency level of implementing the additional item being greater than the original efficiency level without the additional item, selecting a set of devices associated with the efficiency level of implementing the additional item;

distributing corresponding tasks to the selected set of devices;

receiving feedback from the selected set of devices;

modifying the resource allocation engine based at least in part on the feedback from the selected set of devices; and using iterative machine learning to improve the resource allocation engine.

12. The non-transitory computer-readable storage medium of claim 11, wherein the determining of the efficiency level comprises performing a causal analysis of how the additional item impacts the list of tasks and the list of devices.

13. The non-transitory computer-readable storage medium of claim 11, wherein the determining of the efficiency level of implementing the additional item further comprises:

determining if the additional item has sufficient resources;

determining if multiple devices using related data need to be evaluated collectively; and determining if the additional item should be available to at least one of other devices and the distribution system.

14. The non-transitory computer-readable storage medium of claim 11, wherein the list of tasks are from a plurality of disparate business organizations with the distribution system.

15. The non-transitory computer-readable storage medium of claim 11, wherein the commonalities are identified based on a predefined list of capabilities, uses, and scheduling.

* * * * *